United States Patent [19]

Waymire

[11] Patent Number: 4,736,142
[45] Date of Patent: Apr. 5, 1988

[54] SPEED CONTROL SYSTEM FOR ELECTRIC MOTOR

[75] Inventor: John W. Waymire, Indianapolis, Ind.

[73] Assignee: Dart Controls, Inc., Zionsville, Ind.

[21] Appl. No.: 70,168

[22] Filed: Jul. 1, 1987

Related U.S. Application Data

[63] Continuation of Ser. No. 290,813, Aug. 7, 1981, abandoned.

[51] Int. Cl.⁴ .................................. H02P 7/26
[52] U.S. Cl. ...................... 318/345 C; 318/317; 318/345 B
[58] Field of Search ............. 318/341, 345 B, 331, 318/345 C, 317, 345 F, 345 G

[56] References Cited

U.S. PATENT DOCUMENTS

| | | | |
|---|---|---|---|
| 3,229,182 | 1/1966 | Kubler | 318/331 |
| 3,470,437 | 9/1969 | Douglass | 318/345 C X |
| 3,475,672 | 10/1969 | Oltendorf | 318/317 X |
| 3,518,519 | 6/1970 | Callan | 318/332 X |
| 3,601,673 | 8/1971 | Mason | 318/317 X |
| 4,039,913 | 8/1977 | Clegg | 318/332 X |
| 4,074,175 | 2/1978 | Born et al. | 318/332 |
| 4,328,447 | 5/1982 | Davis et al. | 318/331 |

Primary Examiner—Ulysses Weldon
Attorney, Agent, or Firm—Barnes & Thornburg

[57] ABSTRACT

A speed-control system for an electric motor comprises a circuit for setting a desired motor speed and providing a speed-control signal, a circuit for sensing motor voltage and providing a motor voltage-related signal, a circuit for sensing current flow in the motor and providing a motor current-related signal, a summing point for combining the sensed current and sensed voltage-related signals to provide a motor speed-related signal, and a triggerable switch for combining the motor speed-related signal and the speed-control signal to provide an error signal for controlling the motor speed.

28 Claims, 1 Drawing Sheet

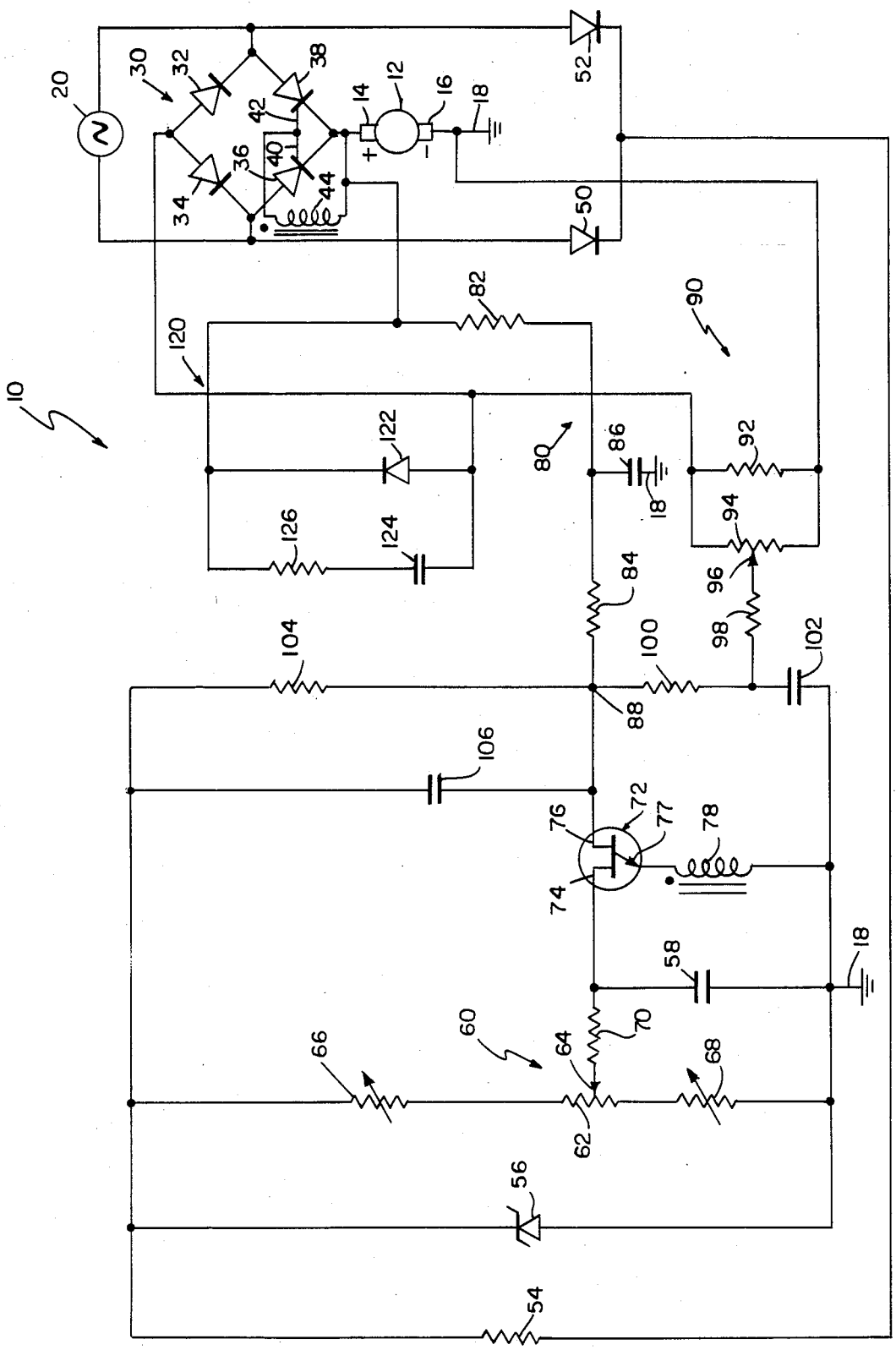

SPEED CONTROL SYSTEM FOR ELECTRIC MOTOR

This is a continuation of co-pending application Ser. No. 290,813 filed on Aug. 7, 1981, now abandoned.

The present invention relates to sytems for controlling the speed of electric motors, particularly DC motors, to maintain a relatively constant speed in response to variations in the load coupled to the motor output. More particularly, the invention concerns an improved system which is simple, inexpensive, and accurate.

Many well-known systems are available for controlling the speed of DC motors. However, most of these systems, particularly the electrical systems, have been complex and relatively expensive to produce. One of the reasons for the complexity and expense of these conventional electrical systems has been the need to include means for amplifying and comparing various signals to generate an error signal for controlling the motor. Therefore, there is a real need for a simple and inexpensive system which will accurately control the speed of a DC motor in response to variations in the load coupled to the output of the motor.

The present invention provides a speed control for an electric motor which eliminates the need for some amplification and isolation stages and is therefore simple and inexpensive.

The prsent invention also provides a speed control for an electric motor which employs a relatively inexpensive semiconductor switch which produces an error signal to accurately control the speed of an electric motor.

According to the present invention, a control system for an electric motor senses motor voltage and motor current, combines the sensed motor voltage and motor current to generate a motor speed-related signal which is supplied to a switching device to produce an error signal when the motor speed-related signal becomes less than a motor speed control signal.

Various features and advantages of the present invention will become apparent in view of the following detailed description of one embodiment thereof, which description should be considered in conjunction with the accompanying drawing, which is a schematic circuit diagram of a speed-control system for an electric motor constructed according to the present invention.

In DC electric motors there are certain well-known mathematical relationships which exist between the back EMF in the armature of the motor (the electric field produced by the motor), the motor voltage, the motor speed, and the iR drop is resistance associated with the armature conductors and brushes of the motor. The following equations express these mathematical relationships.

Equation 1

$$E_g = V - i_a R_a$$

Equation 2

$$E_g = K_g \omega \phi$$

where
$E_g$ = back EMF in the armature of the motor
$K_g$ = a constant for the particular DC motor
$\omega$ = motor speed in radians per second
$\phi$ = magnetic flux from one main field pole of the motor
$V$ = motor voltage
$i_a R_a$ = iR drop in the resistance of the armature conductors and brushes of the motor ($i_a$ = armature current and $R_a$ = resistance of armature and brushes)

From the above mathematical relationships it can be seen that the motor voltage of a DC electrical motor equals the back EMF of the motor plus the iR drop in the resistance of the armature conductors and the brushes. Further, it can be seen that the motor speed ($\omega$) is directly proportional to the back EMF ($E_g$) of the motor. The present invention uniquely utilizes these mathematical relationships to provide a simple and inexpensive speed control system 10 shown in the drawing for an electric motor 12.

Referring particularly to the drawing, a DC motor 12 includes an armature having a positive terminal 14 and a negative terminal 16 coupled to ground 18. A source of electric power 20 for the DC motor 12 typically is an AC supply. DC motors have many applications. Particular applications include appliances such as dishwashers and trash compactors. In these and in other applications, it is desirable to maintain a constant speed of the motor during its operation. As the load on the motor output varies, the speed of the motor 12 will also vary. Therefore, a speed control system is usually provided to maintain a relatively constant motor speed in response to load changes.

The AC power supply 20, such as the household 110 VAC, 60 Hz line, is coupled to the DC motor 12 through an unregulated DC power supply which includes a bridge circuit 30. Circuit 30 includes diodes 32, 34 and silicon-controlled rectifiers (SCR's) 36, 38. Diodes 32, 34 and SCR's 36, 38 provide rectification of the AC signal associated with the power supply 20. SCR's 36, 38 have gates 40, 42 which are commonly coupled to the secondary winding 44 of a pulse transformer. The SCR's 36 and 38 provide current to motor 12 when they are turned on in response to a signal generated at their gate 40 and 42.

The control system 10 also includes a regulated DC power supply. The regulated DC power supply includes diodes 50 and 52, resistor 54, a 12 volt Zener diode 56, and a capacitor 58. Diodes 50 and 52 rectify the signal produced by the AC power supply. The rectified signal is regulated by resistor 54 and Zener diode 56 to provide a level of 12 volts. Capacitor 58 filters the regulated signal to provide a positive DC voltage.

The control system 10 includes a circuit 60 coupled to the regulated DC power supply for providing a speed control signal. The circuit 60 includes a potentiometer 62 having an adjustable wiper 64 for setting a desired motor 12 speed. A potentiometer 66 is coupled between the positive side of the regulated DC power supply and one side of potentiometer 62 for adjusting the maximum speed setting which may be selected from potentiometer 62. A potentiometer 68 is couled between ground 18 and the other side of potentiometer 62. The wiper 64 of potentiometer 62 is coupled through a resistor 70 to a base 74 of a unijunction transistor (UJT) 72. Resistor 70 and capacitor 58 cooperate to provide a smooth desired motor 12 speed signal.

The unijunction transistor 72 includes two bases 74 and 76 and an emitter 77. Base 74 of the transistor 72 is coupled to the circuit 60 through resistor 70 so that the speed control signal generated by circuit 60 is applied to the base 74. The other base 76 is coupled to other parts of the control system 10 in a manner to be explained later. The emitter 77 of the transistor 72 is coupled to the primary winding 78 of the pulse transformer referred to above.

The control system 10 also includes a circuit 80 for sensing motor voltage. The circuit 80 includes series resistors 82 and 84. The circuit 80 also includes a capacitor 86 coupled between the junction of resistors 82, 84 and ground 18 to average the voltage signal generated across motor 12. Circuit 80 is connected between the positive terminal 14 of the armature of the motor 12 and a summing junction 88 in the system 10. The circuit 80 provides a motor voltage-related signal which is applied to the summing junction 88 of the circuit 10. Resistors 82 and 84 have values which scale down the motor voltage signal for application to the junction 88.

The control system 10 further includes a circuit 90 for sensing motor current and generating a motor current-related signal in response thereto. The circuit 90 includes a resistor 92 of small value in series with the motor for sensing the current through the armature of the DC motor. Resistor 92 is coupled between the circuit 60 ground 18 and the "negative" side of bridge 30 to provide across resistor 92 a motor current-related signal which is opposite in polarity to the motor voltage signal across capacitor 86. A potentiometer 94 having an adjustable wiper 96 is connected in parallel with resistor 92. Circuit 90 provides a signal indicative of the iR drop across the resistance of the armature conductors and brushes of the motor 12. Resistor 92 and potentiometer 94 are coupled to the anodes of diodes 32 and 34 in the diode bridge circuit 30, and to the negative terminal 16 of the armature of the motor 12. The wiper 96 of the potentiometer 94 is coupled through a resistor 98 and a resistor 100 to the summing junction 88 of the control system 10. The motor current-related signal generated by the circuit 90 is averaged by a capacitor 102 to produce a smooth "iR loss"-related signal at junction 88.

A further parallel resistor 104 and capacitor 106 are coupled between the junction 88 and cathode of Zener diode 56 to smooth the sum at junction 88 produced by circuits 80 and 90. The motor voltage signal and the motor current signal are combined at junction 88 to generate a signal related to motor speed.

Junction 88 is coupled to base 76 of unijunction transistor 72 so that the motor speed-related signal is applied to base 76.

A conventional circuit 120 commonly referred to as a "flyback" circuit is connected in parallel with the terminals 14, 16 of the armature of the motor 12 to damp positive-going signal spikes in the forward (conducting) direction through a diode 122. The circuit 120 includes a diode 122 coupled in parallel with the serially coupled capacitor 124 and resistor 126. The cathode of diode 122 and resistor 126 are coupled to the positive terminal 14 of the armature of the motor 12. The anode of diode 122 and capacitor 124 are coupled to the anodes of diode 32 and 34 of the bridge circuit 30.

The operation of control sytem 10 can best be described by referring to the mathematical relationship associated with the DC motor 12 referred to previously. The motor voltage (V) sensed by circuit 80 is generally equal to the back EMF ($E_g$) of the armature of the motor plus the iR drop in the resistance of the armature conductors and brushes. Therefore, the motor voltage-related signal generated by circuit 80 will include these two elements. The circuit 90 senses motor current and generates a signal which is related to the iR drop in the resistance of the armature conductors and brushes of the motor 12. The signals developed in control system 10 are described in terms of their polarity with respect to the reference point for control system 10, ground 18. Since resistor 82 and capacitor 86 are connected between the positive side of bridge 30 and the ground 18 while resistor 92 of circuit 90 is connected between the negative side of bridge 30 and ground 18, the signal developed across resistor 82 and capacitor 86 will be positive with respect to ground 18 and the signal generated by circuit 90 will be negative with respect to ground 18. By combining the motor voltage-related signal and the motor current-related signal at junction 88, the iR component of the mathematical relationship between the motor voltage (V) and the back EMF ($E_g$) is cancelled so that the signal related to motor speed generated at junction 88 generally equals the back EMF ($E_g$) of the DC motor 12. As the load on motor 12 increases, the back EMF ($E_g$) decreases. Therefore, the signal generated at junction 88 also decreases when the load on the motor 12 increases. The decrease in the motor speed-related signal at junction 88 is combined with the speed-control signal at the bases 76 and 74, respectively, of the uninjunction transistor 72. When the motor speed-related signal at the base 76 becomes less than the speed-control signal at base 74, current flows in the emitter 77 of unijunction transistor 72 to generate an error signal in primary winding 78 of the pulse transformer. This signal is coupled through secondary winding 44 to the gates 40 and 42 of the SCR's 36 and 38, respectively, and to terminal 14 of the armature of the motor 12. The SCR's 36 and 38 are turned on to increase the speed of the motor. The speed of the motor will be increased until the motor speed-related signal at base 76 becomes greater than the speed-control signal at base 74 of the transistor 72.

What is claimed is:

1. A speed control for an electric motor comprising first circuit means coupling the motor to a source of electrical power, second circuit means providing a signal related to a desired motor speed, third circuit means for sensing motor voltage and generating a signal related thereto, fourth circuit means for sensing motor current and generating a signal related thereto, means for combining the motor voltage signal and the motor current signal to produce a motor speed-related signal, a unijunction transistor having a first base, a second base, and an emitter, means for coupling the combining means to the first base, means for coupling the second circuit means to the second base, and means for coupling the first circuit means to the emitter, the unijunction transistor comparing the motor speed-related signal coupled to its first base with the desired motor speed-related signal coupled to its second base and switching from a non-conducting state to a full conducting state and from the full conducting state to the non-conducting state in response to the comparison to generate a switched error signal at its emitter for controlling the speed of the motor.

2. The speed control of claim 1 wherein the combining means includes a circuit junction for summing the signals from the third and fourth circuit means.

3. The speed control of claim 2 wherein the means for coupling the combining means to the first base of the unijunction transistor comprises means for coupling the circuit junction to the first base.

4. The speed control of claim 3 further including means coupling the third and fourth circuit means to the circuit junction.

5. The speed control of claim 4 wherein the third circuit means includes a voltage divider network for reducing the magnitude of the motor voltage-related signal.

6. The speed control of claim 5 wherein the means for coupling the emitter of the unijunction transistor to the first circuit means includes a transformer.

7. The speed control of claim 1 wherein the motor voltage signal includes components related to two characteristics of the motor, and the motor-current signal includes a component related to one of the two motor characteristics, the combination of the motor voltage signal and the motor current signal cancelling the one motor characteristic from the motor voltage signal to produce the motor speed-related signal, the motor speed-related signal being directly related to the remaining motor characteristic.

8. A speed control for an electric motor comprising means providing a signal reference, means providing a speed control signal, means for coupling the motor to a source of electric power, means for coupling the motor to the reference, means for sensing current flow in the motor and for generating a motor current-related signal in response thereto, means for coupling the current-sensing means to the reference and to the power source, means for sensing the voltage across the motor and for generating a motor voltage-related signal in response thereto, means for coupling the voltage-sensing means to the motor and to the reference, means for combining the sensed current-related and the sensed voltage-related signals to generate a signal related to motor speed, a unijunction transistor having a first base, a second base, and an emitter, means for coupling the motor speed-related signal to the first base, means for coupling the speed-control signal to the second base, the unijunction transistor comparing the signal at its first base with the signal at its second base and switching from a non-conducting state to a full conducting state and from the full conducting state to the non-conducting state in response to the comparison to generate a switched error signal at its emitter for controlling the speed of the motor, and means for coupling the error signal to the means for coupling the motor to the power source to control motor speed.

9. The speed control of claim 8 wherein the means for combining the sensed current-related and sensed voltage-related signals includes a circuit junction for summing the two signals.

10. The speed control of claim 9 wherein the means for coupling the motor speed-related signal to the first base of the unijunction transistor comprises means for coupling the circuit junction to the first base.

11. The speed control of claim 10 wherein the means providing a signal reference is ground.

12. The speed control of claim 11 wherein the voltage-sensing means is coupled to one side of ground and the current-sensing means is coupled to the other side of ground whereby in summing the sensed current-related signal and the sensed voltage-related signal, the current-related signal is of opposite polarity to the voltage-related signal.

13. A method of controlling the speed of an electric motor in response to load variations on the motor output, comprising the steps of providing a signal related to a desired motor speed, sensing motor voltage and generating a signal related thereto, sensing motor current and generating a signal related thereto, combining the motor voltage-related signal and the motor current-related signal to produce a signal related to motor speed, combining the motor speed-related signal and the desired motor signal to generate a switched error signal for controlling the speed of the motor by coupling the motor speed-related signal to a first base of a unijunction transistor and coupling the desired motor speed-related signal to a second base of the unijunction transistor, the unijunction transistor comparing the signal at its first base with the signal at its second base and switching from a non-conducting state to a full conducting state and from the full conducting state to the non-conducting state in response to the comparison to generate the switched error signal at its emitter.

14. The method of claim 13 wherein the motor voltage-related signal and the motor current-related signal are combined by summing the two signals.

15. The method of claim 14 wherein the motor voltage-related signal and the motor current-related signal are summed and the sum signal is coupled to the first base of the unijunction transistor.

16. A method of controlling the speed of an electric motor comprising the steps of sensing motor voltage and generating a signal related thereto, sensing motor current and generating a signal related thereto, summing the motor voltage-related and motor current-related signals, coupling the sum signal to a first base of a unijunction transistor, providing a signal related to a desired motor speed, coupling the desired motor speed related signal to a second base of the unijunction transistor to establish a reference level at the second base of the unijunction transistor, the unijunction transistor selectively switching from a full conducting to a non-conducting state and from the non-conducting to the full conducting state based upon the relative levels of the signals at its first and second bases and thereby generating at its emitter a switched error signal for controlling the motor speed.

17. A speed control for an electric motor comprising first circuit means coupling the motor to a source of electrical power, second circuit means providing a signal related to a desired motor speed, third circuit means for sensing motor voltage and generating a signal related thereto, fourth circuit means for sensing motor current and generating a signal related thereto, means for combining the motor voltage signal and the motor current signal to produce a motor speed-related signal, an electronic switch having first and second inputs and an output, means for coupling the combining means to the first input, means for coupling the second circuit means to the second input, the electronic switch comparing the motor speed-related signal coupled to its first input with the desired motor speed-related signal coupled to its second input and switching from a non-conducting state to a full conducting state and from the full conducting state to the non-conducting state based upon the comparison to generate a switched error signal at its output for controlling the speed of the motor, and means for coupling the output of the electronic switch to the first circuit means, the first circuit means including means responsive to the switched error signal to switch current into the motor windings in response thereto to vary the speed of the motor.

18. The speed control of claim 17 wherein the combining means includes a circuit junction for summing the signals from the third and fourth circuit means.

19. The speed control of claim 18 wherein the means for coupling the combining means to the first input comprises means for coupling the circuit junction to the first input.

20. The speed control of claim 19 further including means coupling the third and fourth circuit means to the circuit junction.

21. The speed control of claim 20 wherein the third circuit means includes a voltage divider network for reducing the magnitude of the motor voltage-related signal.

22. The speed control of claim 21 wherein the means for coupling the output of the electronic switch to the first circuit means includes a transformer.

23. The speed control of claim 17 wherein the motor voltage signal includes components related to two characteristic of the motor, and the motor-current signal includes a component related to one of the two motor characteristics, the combination of the motor voltage signal and the motor current signal cancelling the one motor characteristics from the motor voltage signal to produce the motor speed-related signal, the motor speed-related signal being directly related to the remaining motor characteristic.

24. The speed control of claim 17 wherein the electronic switch comprises a unijunction transistor, the first input comprising a first base of the unijunction transistor, the second input comprising a second base, and the output comprising the emitter.

25. A method of controlling the speed of an electric motor in response to load variations on the motor output comprising the steps of providing a signal related to a desired motor speed, sensing motor voltage and generating a signal related thereto, sensing motor current and generating a signal related thereto, combining the motor voltage-related signal and the motor current-related signal to produce a signal related to motor speed, combining the motor speed-related signal and the desired motor speed signal to generate a switched error signal by coupling the motor speed-related signal to a first input of an electronic switch and coupling the desired motor speed-related signal to a second input of the electronic switch, the electronic switch comparing the signal at its first input with the signal at its second input and switching from a non-conducting state to a full conducting state and from the full conducting state to the non-conducting state in response to the comparison to generate the switched error signal at an output, coupling the switched error signal to the motor, and utilizing the switched error signal to control the speed of the motor.

26. The method of claim 25 wherein the motor voltage-related signal and the motor current-related signal are combined by summing the two signals at a circuit junction.

27. The method of claim 26 wherein the circuit junction comprises the first input of the electronic switch.

28. A method of controlling the speed of an electric motor comprising the steps of sensing motor voltage and generating a signal related thereto, sensing motor current and generating a signal related thereto, summing the motor voltage-related and the motor current-related signals, coupling the summed signal to a first input of an electronic switch, providing a signal related to a desired motor speed, coupling the desired motor speed-related signal to a second input of the electronic switch to establish a reference level at the second input, the electronic switch selectively switching based upon the relative levels of the signals at its first and second inputs from a non-conducting state for a full conducting state to generate a switched error signal at an output of the electronic switch and coupling the switched error signal to the motor to control the speed of the motor.

* * * * *